Figure 1:
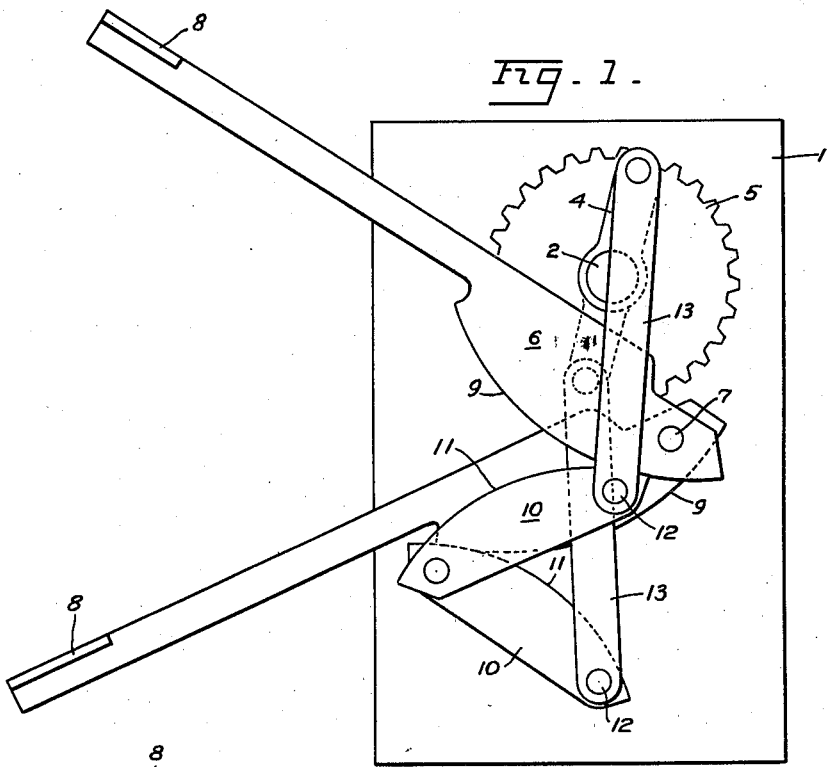
Figure 2:
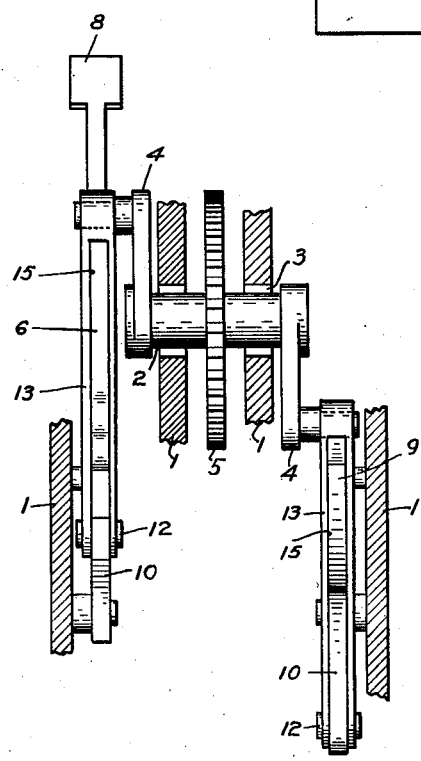

May 7, 1940.  H. T. ATKINSON  2,199,867

POWER TRANSMITTING APPARATUS

Filed May 10, 1939

INVENTOR.
HENRY T. ATKINSON
BY
ATTORNEY.

Patented May 7, 1940

2,199,867

UNITED STATES PATENT OFFICE 2,199,867

POWER TRANSMITTING APPARATUS

Henry T. Atkinson, Oakland, Calif.

Application May 10, 1939, Serial No. 272,766

5 Claims. (Cl. 74—42)

This invention relates to a linkage mechanism for transmitting an applied force between the point of reception and the point of delivery of said force.

An object of the invention is to provide an interconnected linkage structure, so related and proportioned that a selected power or force applied to the structure in a reciprocative form will be transmitted and converted into a rotary form before being delivered from the structure.

Other objects and advantages are to provide an apparatus that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawing:

In detail the construction illustrated in the drawing comprises a frame 1, or other equivalent foundation structure; a crank 2 journaled at 3 in the frame 1; and throws 4—4 on diametrically opposite sides of said crank 2. A sprocket or pulley 5 is keyed or otherwise fixed to the crank 2 for delivering the rotary motion of the crank to a wheel or other device for utilizing rotary motion.

A lever 6 is pivoted at 7 to the frame 1 in operative relation to the crank 2, that is to say said lever would be mounted in planar alignment with the crank but in spaced relation thereto. The free end of the lever is provided with a foot pedal portion 8 or a means of attachment for the reception of a reciprocative force. The edge of the lever 6 adjacent the pivot 7 is provided with a curved shoulder or cam 9 thereon.

A member 10 having a curved edge or cam 11 thereon, is pivoted at one end to the frame 1 and at its other end is pivotally connected at 12 by a link 13 to one of the throws 4 on the crank 2. It is to be understood that a complete assembly of lever 6, member 10 and link 13 is provided on each side of the crank 2.

The ratio of the length of the member 10 to the length of the link 13 is approximately one to two. The length of the curved area or cam 9 on the lever 6 and the similar part 11 on the member 10 is approximately the same.

The link 13 is provided with a longitudinal slot 15 therein and the curved portion 9 of lever 6 is adapted to be extended through said slot and to be confined therein in its reciprocative movement.

In the operation of the device the curved edges 9 and 11 are adapted to roll against each other. A pressure or force applied to the free end of the lever 6 causes said lever to be reciprocated or oscillated in a downward direction. The downward movement of the lever 6 causes the cam 9 to roll or work against the companion cam 11 and to force the free end of the member 10 in a downward direction. Such movement of said member causes the link 13 to pull downwardly on one of the crank throws 4 and to partially rotate the shaft 2. At this moment the force or pressure would be shifted to the other pedal 6, and by a repetition of the previously described movement, causes a further partial rotation of the crank 2. By applying a force or pressure, alternately, to the pedal levers 6, it is possible to translate or convert that reciprocative or oscillating movement into a continuous rotary movement of the crank 2.

The ratios between the various lengths of the parts is such that the power applied to the levers 6 is decreased by the time it is delivered to the crank 2.

Having thus described this invention, what I claim and desire to secure by Letters Patent is:

1. A device of the character described including a crank journaled in a frame, said crank having diametrically opposed throws thereon; a member having an outwardly curved edge and having one end thereof pivotally mounted on said frame, there being one of said members on each of the opposite sides of said crank; a link pivotally connected at one end to each of the crank throws and pivotally connected at its other end to the free end of said member; and a pair of pedal members each having an end thereof pivoted to the frame, an end of each pedal member near the pivot having an outwardly curved edge in rolling contact with the curved edge of the first mentioned member, whereby pressure applied alternately to the free ends of the pedal members will be translated through and increased by the curved edges of the members and links before delivery to the throws of the crank and conversion by said crank into rotary motion.

2. A device of the character described including a crank journaled in a frame, said crank having diametrically opposed throws thereon; a member having an outwardly curved edge and having one end thereof pivotally mounted on said frame, there being one of said members on each of the opposite sides of said crank; a link pivotally connected at one end to each of the crank throws and pivotally connected at its other end to the free end of said member; and a pair of pedal members each having an end thereof pivoted to the frame, an end of each pedal member near the pivot having an outwardly curved edge in rolling contact with the curved edge of the first mentioned member, the curved end of each pedal member being pivoted to the frame at a point adjacent the free end of the first mentioned member and between said first mentioned member and the crank, whereby pressure applied alternately to the free ends of the pedal members will be translated through and increased by the curved edges of the members and links before delivery to the throws of the crank and conversion by said crank into rotary motion.

3. A device of the character described including a crank journaled in a frame, said crank having diametrically opposed throws thereon; a member having an outwardly curved edge and having one end thereof pivotally mounted on said frame, there being one of said members on each of the opposite sides of said crank; a link pivotally connected at one end to each of the crank throws and pivotally connected at its other end to the free end of said member; each link having a longitudinally disposed slot therethrough; and a pair of pedal members each having an end thereof pivoted to the frame, an end of each pedal member near the pivot having an outwardly curved edge in rolling contact with the curved edge of the first mentioned member and each pedal member being confined to oscillate in the slot in its corresponding link whereby pressure applied alternately to the free ends of the pedal members will be translated through and increased by the curved edges of the members and links before delivery to the throws of the crank and conversion by said crank into rotary motion.

4. A device of the character described including a crank journaled in a frame, said crank having diametrically opposed throws thereon; a member having an outwardly curved edge and having one end thereof pivotally mounted on said frame, there being one of said members on each of the opposite sides of said crank; the ratio of the length of the member between pivots to the length of the link between pivots being approximately one to two; a link pivotally connected at one end to each of the crank throws and pivotally connected at its other end to the free end of said member; and a pair of pedal members each having an end thereof pivoted to the frame, an end of each pedal member near the pivot having an outwardly curved edge in rolling contact with the curved edge of the first mentioned member, the curved end of each pedal member being pivoted to the frame at a point adjacent the free end of the first mentioned member and between said first mentioned member and the crank, whereby pressure applied alternately to the free ends of the pedal members will be translated through and increased by the curved edges of the members and links before delivery to the throws of the crank and conversion by said crank into rotary motion.

5. A linkage mechanism interposed between power input and power output mediums for converting the power received from that of reciprocative motion to that of rotary motion including a power output medium in the form of a crank journaled to rotate in a frame, a throw on said crank; a lever having one end pivoted to said frame, adjacent said crank, the free end of said lever being a power input medium; an outwardly curved cam on an edge of said lever adjacent the pivot; a member pivoted at one end to the frame and having an outwardly curved cam on an edge thereof in cooperative relationship to the cam on said lever; and a link pivotally connecting the free end of the member to the crank throw.

HENRY T. ATKINSON.